(12) United States Patent
Wang et al.

(10) Patent No.: US 10,659,440 B2
(45) Date of Patent: May 19, 2020

(54) OPTIMIZING UTILIZATION OF SECURITY PARAMETER INDEX (SPI) SPACE

(71) Applicant: Nicira, Inc., Palo Alto, CA (US)

(72) Inventors: Dexiang Wang, San Jose, CA (US); Zhen Mo, Palo Alto, CA (US); Fang Peng, Palo Alto, CA (US); Bo Hu, Palo Alto, CA (US); Helen Liu, Palo Alto, CA (US)

(73) Assignee: Nicira, Inc., Palo Alto, CA (US)

(*) Notice: Subject to any disclaimer, the term of this patent is extended or adjusted under 35 U.S.C. 154(b) by 204 days.

(21) Appl. No.: 15/827,368

(22) Filed: Nov. 30, 2017

(65) Prior Publication Data

US 2019/0166109 A1 May 30, 2019

(51) Int. Cl.
*H04L 29/06* (2006.01)
*H04L 9/06* (2006.01)
*H04L 9/14* (2006.01)
*H04L 9/08* (2006.01)

(52) U.S. Cl.
CPC ............ *H04L 63/06* (2013.01); *H04L 9/0637* (2013.01); *H04L 9/0643* (2013.01); *H04L 9/0838* (2013.01); *H04L 9/0894* (2013.01); *H04L 9/14* (2013.01); *H04L 2212/00* (2013.01)

(58) Field of Classification Search
CPC ..... H04L 63/06; H04L 9/0637; H04L 9/0894; H04L 9/14; H04L 2212/00; H04L 63/00–20; H04L 12/4633; H04L 12/4641; H04L 2209/125; H04L 2209/24; H04L 45/02; H04L 45/64; H04L 47/125; H04L 63/0272; H04L 63/0428; H04L 63/10; H04L 63/102; H04L 63/104; H04L 63/164; H04L 63/166; H04L 63/20; H04L 63/205; H04L 67/10; H04L 67/1027; H04L 67/1036; H04L 67/14; H04L 67/327; H04L 9/0819; H04L 9/088; H04L 63/061
See application file for complete search history.

(56) References Cited

U.S. PATENT DOCUMENTS

| | | | | |
|---|---|---|---|---|
| 7,434,045 | B1* | 10/2008 | Enderwick | H04L 63/06 713/158 |
| 7,577,837 | B1* | 8/2009 | Ithal | H04L 63/0428 709/225 |
| 7,818,563 | B1* | 10/2010 | Dwork | H04L 63/06 713/151 |
| 7,826,614 | B1* | 11/2010 | Kaniz | H04L 9/0637 380/28 |

(Continued)

OTHER PUBLICATIONS

Kent et al., RFC2401 RFC 2401—Security Architecture for the Internet Protocol, IETF, Nov. 1998. (Year: 1998).*

*Primary Examiner* — Kambiz Zand
*Assistant Examiner* — Shu Chun Gao
(74) *Attorney, Agent, or Firm* — Patterson + Sheridan, LLP (57) ABSTRACT

Certain embodiments described herein are generally directed to methods and apparatus for providing a security parameter index (SPI) value for use in establishing a security association between a source tunnel endpoint and a destination tunnel endpoint. In some embodiments, utilization of the SPI bit space is optimized to allow the scaling of key policies within a network. In some embodiment, using an SPI derivation formula, a server in the network is able to generate SPI values whose bit spaces are optimized to allow key policies to scale out.

24 Claims, 7 Drawing Sheets

(56) References Cited

U.S. PATENT DOCUMENTS

| | | | | |
|---|---|---|---|---|
| 7,885,405 B1* | 2/2011 | Bong | ............... | H04L 9/0637 |
| | | | | 380/28 |
| 7,984,495 B1* | 7/2011 | Aravind | ............ | H04L 12/4641 |
| | | | | 726/15 |
| 8,352,725 B1* | 1/2013 | O'Toole, Jr. | ............ | H04L 63/20 |
| | | | | 713/151 |
| 8,484,473 B2* | 7/2013 | Zee | ............ | H04L 63/061 |
| | | | | 713/171 |
| 8,885,471 B2* | 11/2014 | Giaretta | ............ | H04L 47/2441 |
| | | | | 370/230 |
| 8,923,272 B2* | 12/2014 | Zhang | ............ | H04L 63/0281 |
| | | | | 370/278 |
| 9,246,876 B1* | 1/2016 | Melam | ............ | H04L 12/4641 |
| 9,729,581 B1* | 8/2017 | Skene | ............ | H04L 63/20 |
| 9,942,201 B1* | 4/2018 | Olofsson | ............ | H04L 63/0272 |
| 2004/0093524 A1* | 5/2004 | Sakai | ............ | H04L 63/061 |
| | | | | 726/1 |

* cited by examiner

OPTIMIZING UTILIZATION OF SECURITY PARAMETER INDEX (SPI) SPACE

BACKGROUND

IPsec security protocols are widely used to protect packets communicated between endpoints (EPs), such as over the Internet, between gateways, between data centers (e.g., on premises data centers, cloud data centers) within data centers, etc. For example, with respect to IPsec encryption/tunnel protocols, security associations (SAs) may be established by tunnel endpoints ("TEPs") that are part of the communication path between the EPs. Each security association is a one-way or simplex connection, and therefore at least two security associations, one for each direction, are established between two IPsec peers (e.g., endpoints or tunnel endpoints, as described below). These security associations are a form of contract between the IPsec peers detailing how to exchange and protect information among each other. In some embodiments, each security association is comprised of a mutually agreed-upon key, one or more security protocols, and/or a security parameter index (SPI) value. After security associations have been established between two IPsec peers, an IPsec protocol may be used to protect data packets for transmission.

For IPsec in the Encapsulating Security Payload (ESP) tunnel mode, security associations are established between TEPs for applying IPsec protocols to encrypt and encapsulate egress packets from a source EP and decrypt and decapsulate ingress packets for a destination EP to secure communication between the EPs. For example, a source EP may be configured to generate and route egress IP packets to a source TEP associated with the source EP. In particular, the source EP may generate an IP packet including a header with the IP address of the source EP set as the source IP address and the IP address of the destination EP set as the destination IP address. A MAC address of the source TEP may further be set as a next-hop MAC address of the IP packet in the header.

The source TEP receives the IP packet and encrypts the original IP packet including the header of the original IP packet based on a security association established between the source TEP and the destination TEP for data transfer between the source EP and destination EP. For example, the source TEP encrypts the original IP packet with a mutually agreed-upon key of the security association between the source TEP and the destination TEP. The source TEP further encapsulates the encrypted packet by adding a new IP header and an ESP header (e.g., including an SPI value corresponding to the security association used to encrypt the packet) to the encrypted packet to generate an encapsulated ESP encrypted data packet. In the new IP header, the source TEP includes a source IP address of the source TEP and a destination IP address of the destination TEP. The new IP header is used to forward the encapsulated ESP encrypted data packet through a network from the source TEP to the destination TEP.

The destination TEP may then decapsulate and decrypt the encapsulated ESP encrypted data packet to extract the original IP packet. For example, the destination tunnel endpoint may determine the security association (e.g., mutually agreed-upon key) to use to decrypt the encapsulated ESP encrypted data packet based on the SPI value included in the ESP header. Based on the destination IP address in the header of the original IP packet, the destination tunnel endpoint forwards the original IP packet to the destination endpoint.

In some cases, SPI values used in security associations established between TEPs are 32-bit binary values. The 32-bit SPI values include 17-bit TEP labels that are generated and assigned to TEPs for identification. The 32-bit SPI values also include 2-bit shift factors used for altering the SPI values. However, only 13 bits of the 32-bit SPI values remain for identifying key policies assigned to the TEPs in the network. Accordingly, only 8,192 ($2^{13}$) key policies may be generated and assigned by network administrators to the TEPs in the network because only that many key policies are identifiable by SPI values. In some cases, this may limit the scaling out of key policies when such scaling is advantageous or necessary.

SUMMARY

Herein described are one or more embodiments of a method for providing a security parameter index (SPI) value for use in establishing a security association between a source tunnel endpoint and a destination tunnel endpoint. The method includes receiving, at a server, a request from the source tunnel endpoint for a SPI value for use by the source tunnel endpoint in establishing the security association with the destination tunnel endpoint for securing an exchange of one or more data packets between a source endpoint and a destination endpoint. The method further includes deriving, at the server, the SPI value using a SPI derivation formula based on a key policy assigned to the source tunnel endpoint and the destination tunnel endpoint, wherein most bits from the SPI value are associated with the key policy. The method further includes transmitting, at the server, the SPI value to the source tunnel endpoint for use by the source tunnel endpoint in establishing the security association, wherein the established security association is used by the source tunnel endpoint to encapsulate and encrypt at least a data packet from the one or more data packets received from the source endpoint and destined for the destination endpoint, the encapsulated encrypted data packet comprising a first header and an encrypted payload, the first header comprising a source IP address of the source tunnel endpoint, a destination IP address of the destination tunnel endpoint, and the SPI value, the encrypted payload comprising a second header comprising a source IP address of the source endpoint and a destination IP address of the destination endpoint, and wherein the encapsulated encrypted data packet is transmitted by the source tunnel endpoint to the destination tunnel endpoint.

Also described herein are embodiments of a non-transitory computer readable medium comprising instructions to be executed in a computer system, wherein the instructions when executed in the computer system perform the method described above for providing a security parameter index (SPI) value for use in establishing a security association between a source tunnel endpoint and a destination tunnel endpoint.

Also described herein are embodiments of a computer system, wherein software for the computer system is programmed to execute the method described above for providing a security parameter index (SPI) value for use in establishing a security association between a source tunnel endpoint and a destination tunnel endpoint.

Also described herein are embodiments of a computer system comprising means for executing the method described above for providing a security parameter index (SPI) value for use in establishing a security association between a source tunnel endpoint and a destination tunnel endpoint.

DETAILED DESCRIPTION

Figure 1:
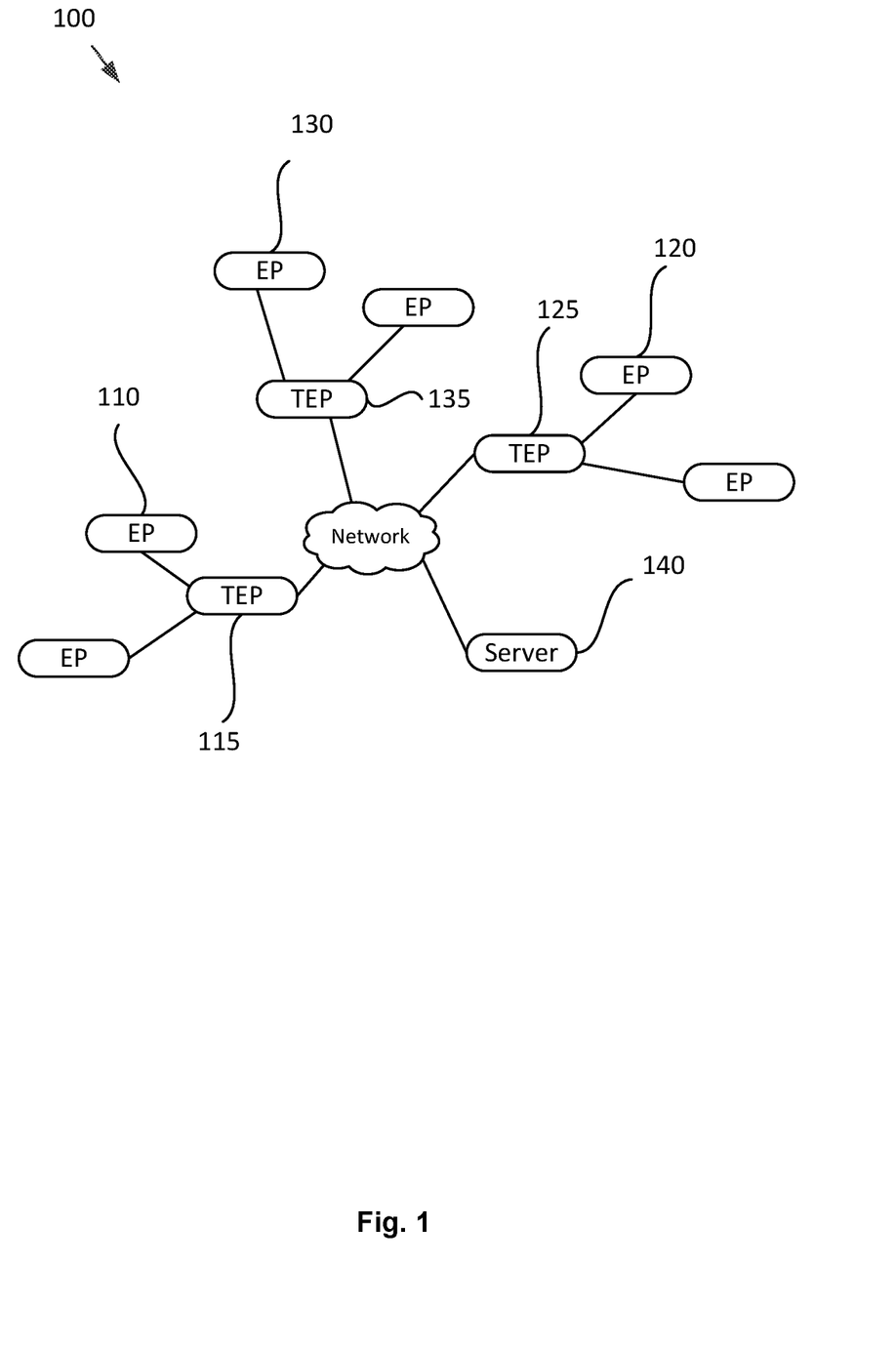
FIG. 1 illustrates an example of a network, in accordance to some embodiments.

Embodiments presented herein relate to systems and methods for providing a security parameter index (SPI) value for use in establishing a security association between a source tunnel endpoint and a destination tunnel endpoint FIG. 1 illustrates an example of a network 100. In certain embodiments, network 100 represents a physical network. As shown by FIG. 1, network 100 connects a plurality of tunnel endpoints (TEPs), including TEP 115, TEP 125, and TEP 135, and a server 140. A TEP may be a physical computing device (e.g., physical server, physical host). In certain embodiments, a TEP may be a virtualized computing instance as further discussed herein. Although not shown, network 100 may include hundreds or thousands or TEPs, each TEP connecting many endpoints (EPs) together in a logical overlay network. For example, as shown in FIG. 1, TEPs 115 and 125 connect endpoints (EPs), including EP 110 and EP 120, in a logical overlay network.

An EP refers generally to an originating EP ("source EP") or terminating EP ("destination EP") of a flow of network packets, which can include one or more data packets passed from the source to the destination EP. In practice, an EP may be a physical computing device (e.g., physical server, physical host). In certain embodiments, an EP may be a virtualized computing instance (e.g., virtual machine, container, data compute node, isolated user space instance) as further discussed herein.

In network 100, EPs may communicate with or transmit data packets to other EPs via tunnel endpoints (TEPs) as discussed. For example, EP 110 may transmit a data packet to EP 120 in a secured fashion via TEPs 115 and 125, acting as a source TEP and a destination TEP, respectively. TEPs 115 and 125 may implement IPsec protocols, including ESP tunnel mode, to secure communication between one another. In some embodiments, before any data can be securely transferred using the IPsec framework, TEPs 115 and 125 may establish security associations (e.g., including a mutually agreed-upon key, one or more security protocols, and/or a SPI value) for EPs 110 and 120.

The mutually agreed-upon key (e.g., encryption/decryption key), in some embodiments, is generated by a server (e.g., server 140) and subsequently distributed to TEPs 115 and 125 associated with the EPs 110 and 120. The one or more security protocols, described above, may be one or more IPsec security protocols such as Authentication Header (AH), Encapsulating Security Payload (ESP), etc. After security associations have been established between TEPs 115 and 125, one or more of these security protocols may be used to protect data packets for transmission. Though certain embodiments are described herein with respect to the ESP security protocol, other suitable IPsec security protocols (e.g., AH protocol) alone or in combination with ESP, may be used in accordance with the embodiments described herein. Further, the embodiments described herein may similarly be used for different types of traffic such as IPv4, IPv6, etc.

In addition to a mutually agreed-upon key and security protocol, a security association includes an SPI value. In some embodiments, each SPI value is a binary value associated with a security association, which enables a TEP to distinguish among multiple active security associations. As an example, SPI values may be used to distinguish between the inbound and outbound security associations of different EPs. In some cases, the Internet Key Exchange (IKE) protocol is used to generate these SPI values and encryption/decryption keys in the IPsec framework. For example, prior to any data exchange, IKE performs a two-phase negotiation session, which results in establishing two security associations between two IPsec peers (e.g., TEPs). These security associations may not only contain mutually agreed-upon encryption and decryption keys to be used for incoming and outgoing traffic (e.g., of an EP), but also maintain sequence numbers for each data transfer. These sequence numbers are maintained to ensure anti-replay, which prevents hackers from injecting or making changes in data packets that travel from a source to a destination TEP. However, if the IKE protocol is used to establish these security associations in a network with, for instance, (N) number of EPs, then each TEP may need to set up (N−1) IKE negotiation sessions for each EP the TEP is associated with.

Accordingly, in some cases, instead of using IKE, distributed network encryption (DNE) may be utilized to simplify key management, including key generation and exchange, and SPI allocation. DNE provides a central unit, e.g. server 140, that generates and distributes encryption/decryption keys and SPI values to TEPs in a network. DNE also simplifies protecting network traffic of TEPs by allowing users (e.g., network administrators) to define simple security rules and key policies. For example, in some embodiments, server 140 may store, in its memory, a plurality of security rules and key policies. Security rules may be user-defined rules that users input into the central unit through an interface (e.g., via a manager, which may be a physical computing device or a virtualized computing instance supported by a physical computing device). Security rules may define which key polices are assigned to which TEPs in a network, such as network 100. For example, a single key policy may be assigned to tens or hundreds of TEPs. A key policy that is associated with one or more TEPs may include certain specifications (e.g., one or more of an algorithm, action, strength of the key, etc.) that define properties of an encryption/decryption key. The key policy is, therefore, used by server 140 to generate an encryption/decryption key for data transfer between TEPs for EPs in a network. Server 140 stores information relating to which key policies are assigned to which TEPs.

Figure 2:
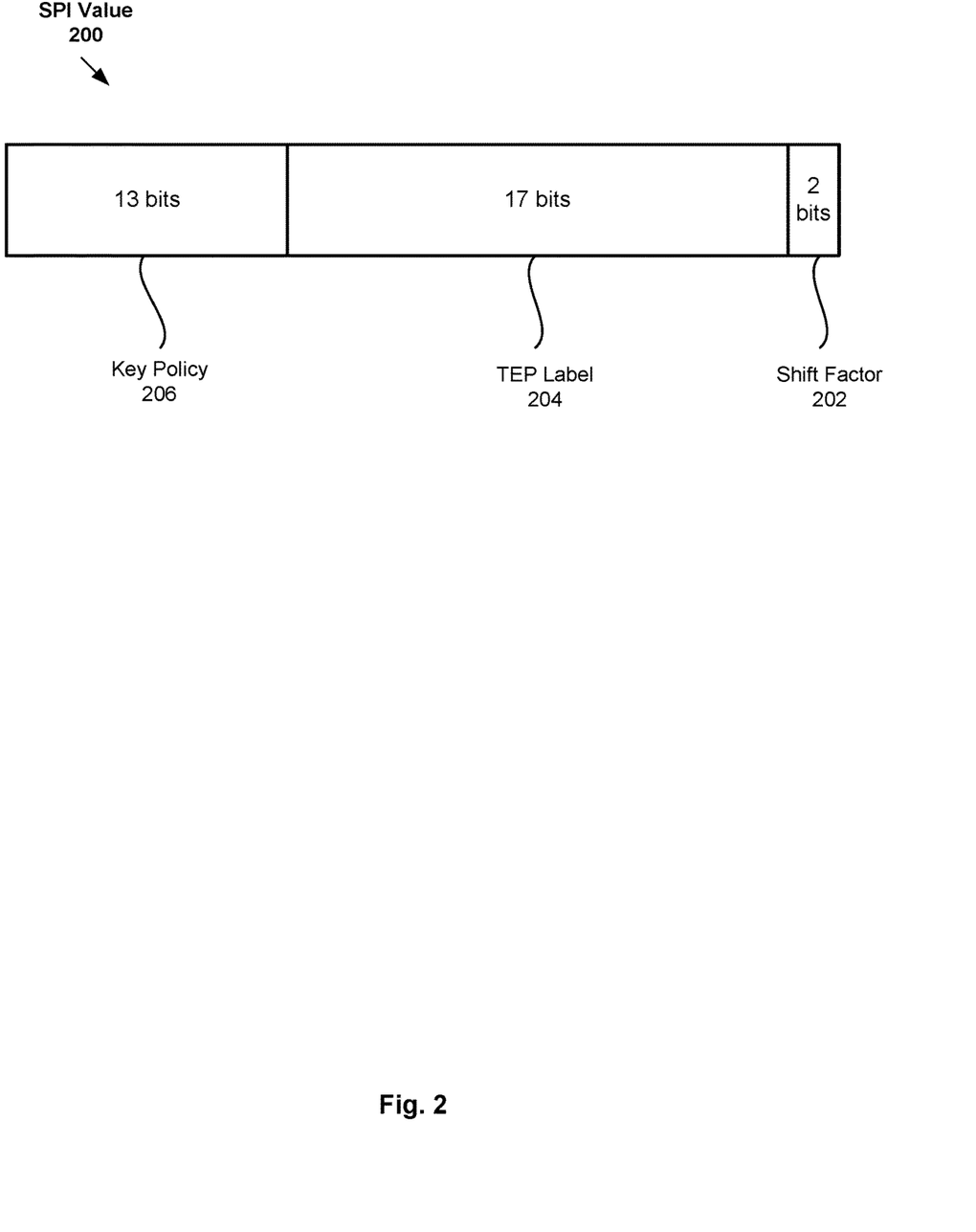
FIG. 2 illustrates a visual example of an SPI value, according to some embodiments.

As described above, DNE provides a central unit that generates and distributes SPI values to TEPs in a network such as network 100. In some cases, SPI is a 32-bit binary value, whose 32 bits are allocated to representing three data points including (1) a key policy, (2) a TEP label, and (3) a shift factor. FIG. 2 illustrates a visual example of a 32-bit SPI value as well as the allocation of the bits to the three data points described above. As shown in FIG. 2, SPI value 200 comprises shift factor 202, TEP label 204, and key policy 206. Shift factor 202 occupies two bits of the 32 bits and is used for altering SPI value 200 in response to a restart of the TEP, for which SPI value 200 is being generated. For example, shift factor 202 may vary depending on whether or not the TEP has been restarted or not or how many times it has been restarted. SPI value 200 also includes TEP label 204 that is used to identify the TEP for which the SPI value is being generated.

In some cases, TEP label 204 is a 17-bit value that is generated and assigned to the TEP prior to any SPI generation for the TEP. As a result, when being used in a binary SPI value, TEP label 204 occupies 17 of the 32 bits. The 17 bits may be used for identifying 131,072 ($2^{17}$) TEPs in the network (e.g., network 100), each 17-bit binary value corresponding a single TEP's label. As 19 bits of the 32 bits are occupied by TEP label 204 and shift factor 202, only 13 bits remain for identifying key policy 206 associated with the TEP that the SPI value is being generated for. The 13 bits correspond to 8,192 ($2^{13}$) binary values, meaning that only 8,192 key policies can be created for allocation across the entire network. Therefore, allocating 17 bits of the 32 bits to TEP 204 eliminates the possibility of creating more than 8,192 key policies, which may limit the usability of DNE in situations where scaling out the number of key policies is advantageous or necessary.

As discussed, the SPI value for each SA between two TEPs may be unique. However, different pairs of TEPs may use the same key policy for establishing an SA. Accordingly, though the same key policy value may be used for generating SPI values for the different pairs of TEPs, different TEP labels may be used, corresponding to the different TEPs, and therefore the SPI values may be unique.

However, in most cases, only a small fraction of pairs of TEPs may use the same key policy for establishing a SA. Therefore, it may not be necessary, for every key policy, to be able to be uniquely associated with every TEP, and correspondingly every TEP label in an SPI value. Accordingly, in such cases, there would be no need to allocate 17 bits of the SPI bit space for identifying and associating all potential TEP labels with each key policy in an SPI value. As an example, when a key policy spans across (i.e., is assigned to/associated with) 128 TEPs, only 7 bits are required to identify the 128 TEP labels that may be associated with the key policy in the SPI value. As a result, the actual utilization efficiency of the SPI bit space for that specific key policy is only around 0.1% (($2^7$)/($2^{17}$)~=0.1%). In such an example, an inefficient allocation of the SPI bits results in significantly reducing the scalability of key policies within the network.

Accordingly, certain embodiments described herein relate to optimizing the utilization of the SPI bit space.

In some embodiments, instead of allocating 17 bits of the 32 bit SPI bit space to provide a big enough space for uniquely identifying all potential (e.g., 131,072) TEPs in a network as associated with a given key policy in an SPI value, a fewer number of bits of an SPI value may be used for only identifying a limited number of TEPs that each key policy may be assigned to. In particular, even though not all TEPs can be identified as associated with a given key policy in such an SPI value, that may not be problematic, as any given key policy may not be associated with more than the limited number of TEPs. Further, certain embodiments herein describe systems and methods for adapting the number TEPs that can be associated with a key policy in an SPI value. In some embodiments, the number of bits used for identifying potential TEPs in an SPI bit space may be based on a common span of each key policy across TEPs. For example, in some embodiments, each key policy in a network may span across up to 1000 TEPs, meaning that, in such an example, allocating 10 bits of the 32 bits in the SPI bit space may be enough for identifying all possible TEPs associated with each given key policy. This is because allocating 10 bits for identifying TEPs results in a universe of 1,024 ($2^{10}$) TEP labels being available for each key policy. In the embodiments described herein, each universe of TEP labels is referred to as a bank of TEP labels having a certain bank index number. Accordingly, each key policy may be assigned a bank index number corresponding to a bank of ($2^{10}$) TEP labels. Mappings between key policies and bank indices may be accessed or stored by the central controller (e.g., server 140, central controller 720).

In the example above, a result of limiting the number of bits allocated to identifying potential TEPs for TEPs associated with a particular key policy to 10 bits is that 20 bits become available for identifying bank indices that may be assigned to key policies. More specifically, in such an example, 1,048,576 million ($2^{20}$) 20-bit bank indices become available for allocation to key policies allowing, for example, a network administrator to create and assign up to 1,048,576 million key policies in the network.

Figure 3:
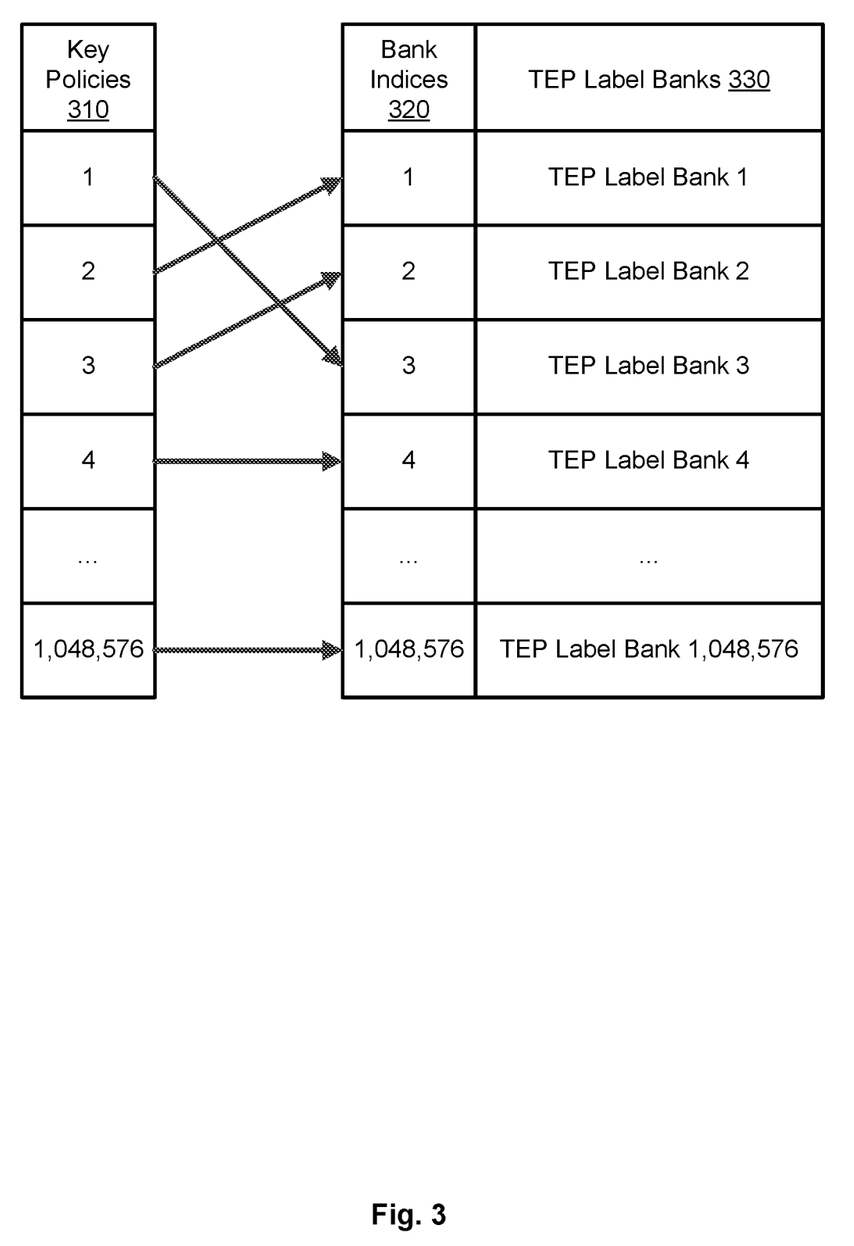
FIG. 3 illustrates an example number of key policies, each being assigned a bank index from a set of bank indices, according to some embodiments.

FIG. 3 illustrates an example number of key policies 310, each being assigned a bank index from bank indices 320 corresponding TEP label banks 330. As shown, configuring the TEP label bank size as ($2^{10}$), allows for allocating 20 bits of the SPI value to bank indices 320, which translates into 1,048,576 available bank indices and, therefore, the ability to create and assign 1,048,576 key policies in a network. For example, FIG. 3 shows key policy 1 assigned to bank index 3, which is a 20-bit binary value that corresponds to TEP label bank 3. In such an example, there are 1,024 binary TEP labels available for identifying TEPs that may be assigned to key policy 1.

In order to generate an SPI value according to embodiments described above, an SPI derivation formula may be used. The following is an example of a formula that may be used for deriving an SPI value:

$$SPI(K, V, S\_V) = (K*V\_Bank + Hash(V)) << 2 + S\_V \& 0x03$$

In the formula above, SPI represents a binary value with a limited size, such as 32 bits. V_Bank is the TEP label bank size. As discussed above, in some embodiments, the bank size may be based on a common span of key policies across TEPs and may, therefore, be adjusted if the common span of key policies changes. In the example described above, the bank size is ($2^{10}$) but, in other examples, the bank size may be different and may be adjusted higher or lower. K is the bank index number (e.g., from bank indices 320) allocated to a key policy (KP) that the SPI value is being generated for. As described above, mappings (e.g., hash function, or hash table, etc.) between key policies and bank indices may be accessed or stored by the central controller (e.g., server 140, central controller 720). Accordingly, K is derived using a mapping that maps key policies to bank index numbers (or a number of bank index numbers as further described in relation to the second SPI derivation formula). For example, as further described in relation to FIG. 5, after receiving a request from a TEP (e.g., TEP 115) for an SPI value, in some embodiments, server 140 first determines the key policy that is assigned to the TEP. In some embodiments, server 140 makes this determination based on the TEP's label. After identifying the key policy assigned to the TEP, server 140 determines the bank index (or a number of bank indices as described in relation to FIG. 5) assigned to the key policy using a mapping and, therefore, further determines the bank index number (K) of the TEP label bank.

In the example above, where the bank size is ($2^{10}$) and the SPI is 32 bits, 20 bits of the 32 bits become available for identifying bank indices. As a result, a bank index may be selected from a range of 0 to ($2^{20}-1$) (i.e., 0 to 1,048,576). V corresponds to a TEP label (or value) that, as discussed above, may be a 17 bit value, which may be hashed into a 10 bit TEP value in a TEP label bank. The TEP label may be selected from a range of 0 to ($2^{17}-1$) labels. Hash ( ) corresponds to a hash function (or hash table) to hash or map TEP labels (e.g., 17-bits) into a value (e.g., 10-bits) in a TEP label bank. As discussed above, one of the reasons a hash function is used is that initially all the TEP labels are generated as, for example, 17-bit values but using the hash function they are mapped to, for example, 10-bit values in a range of 0 to ($2^{10}-1$). S_V is a shift factor for the selected TEP label, V. Shift factor may be selected with a value from a range of 0 to 3.

In some embodiments, the hash function (or hash table, or mapping) may be maintained by a central controller such as server 140. In such embodiments, server 140 uses the hash function to hash or map 17-bit TEP labels into 10-bit TEP labels, as discussed above. For example, the hash function may take a number of 17-bit TEP labels as input, in order, and hash them each into a 10-bit TEP label. In such an example, there is a possibility of hash collisions occurring. For example, TEP label bank may have 1,024 ($2^{10}$) slots or 10-bit TEP labels available. In such an example, the hash function may receive 17-bit TEP label 1 and hash it to a 10-bit TEP label at, for example, slot 100. Next, the hash function may receive 17-bit TEP label 2 and initially hash it to slot 100 as well, which results in a hash collision that the hash function may resolve using a hash collision resolution method (e.g., chaining) by finding an empty slot within the TEP label bank and hashing TEP label 2 to that empty slot. Configuring the central controller (e.g., server 140) to store and utilize the hash function may be advantageous over storing the hash function on other network entities, such as the TEP for which the SPI value is being generated. This is because in situations where hash collisions take place, different TEPs may derive different hash values depending on the order of 17-bit TEP labels being received by the TEPs, thereby resulting in different SPI values being calculated for the same security association. Configuring the central controller to store and utilize the hash function prevents such unpredictable results.

Figure 4:
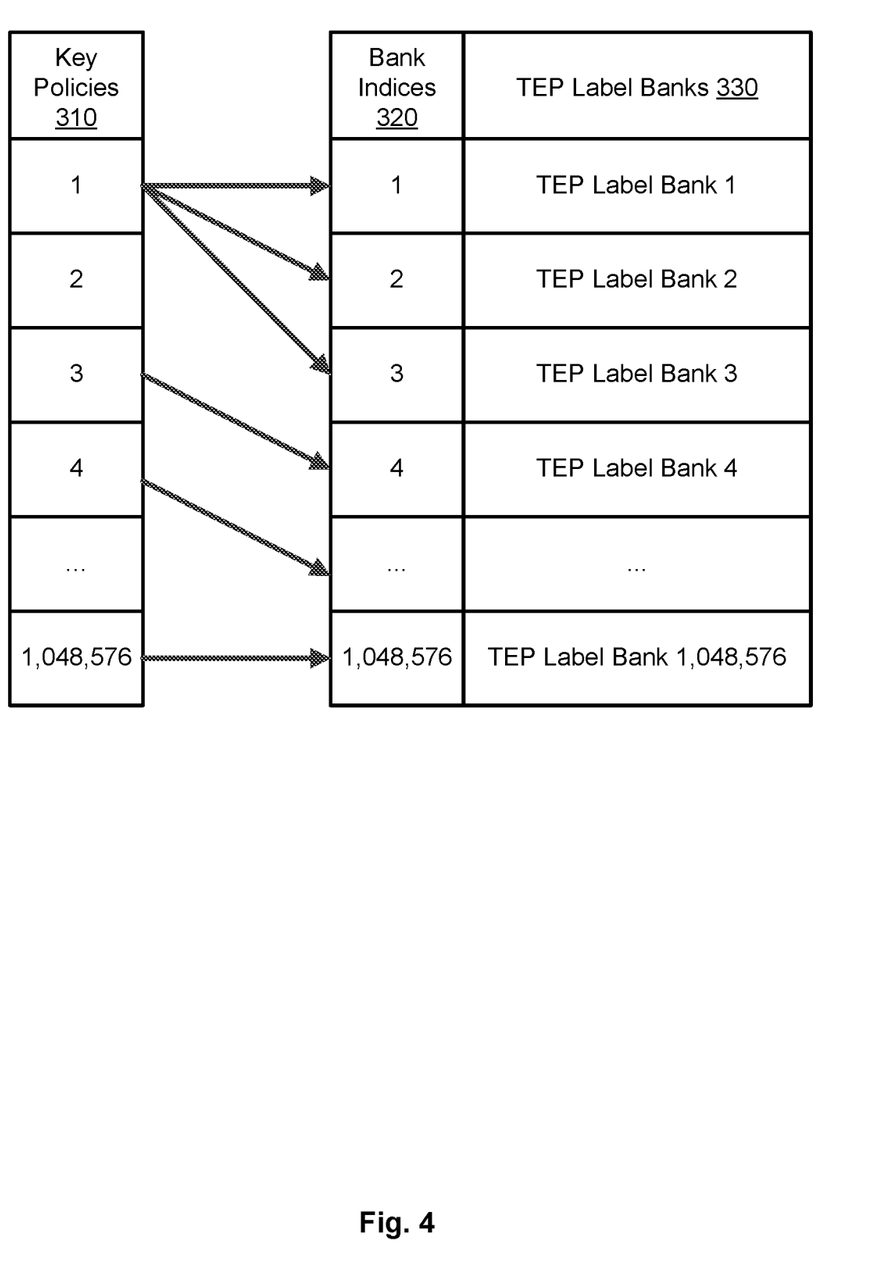
FIG. 4 illustrates an example number of key policies, one or more of which are assigned more than one bank index, according to some embodiments.

In some embodiments, a certain key policy's span may exceed the configured bank size. For example, in the example above, a key policy may be assigned to more than 1,024 ($2^{10}$) TEPs. In such embodiments, more than one TEP label bank may be assigned to the key policy. FIG. 4 illustrates an example of a number of bank indices being assigned to a single key policy (e.g., key policy 1). For example, in the embodiments of FIG. 4, key policy 1 may be assigned to 2560 TEPs. In such embodiments, three bank indices (e.g., bank indices 1, 2, and 3) may be assigned to key policy 1. In embodiments where a key policy may be assigned to TEPs with a number higher than the number of TEP labels in a bank size, a different SPI derivation formula may be used than what was described above. The following is an example of a formula that may be used, in some embodiments, for deriving an SPI value for a key policy that is assigned more than one bank index.

$$SPI(K,V,S\_V)=(K\_Set[Hash'(V)\% \ Card(K\text{-}Set)]$$
$$*V\_Bank+Hash(V))<<2+S\_V\&0x03$$

In the formula above, SPI represents a binary value with a limited size, such as 32 bits. V_Bank is the TEP label bank size, as described above. K_Set corresponds to the set of bank indices allocated to the key policy for which the SPI value is being generated for. K_Set, as described above, is determined using a mapping that maps key policies to one or more bank indices. K_Set [K] corresponds to the K+1th bank index in K_Set. For example, if a key policy is assigned to 5 bank indices, bank index 40-44, then K_Set [4] refers to the fifth bank index in the set, which is bank index 44. As shown K=Hash' (V) % Card (K-Set). Card (K_Set) corresponds to the cardinality of K_Set, which is the number of bank indices−1 in K_Set. Hash' (V) corresponds to a hash function configured to identify the bank index of a certain TEP label. As described above, V corresponds to a TEP label (e.g., that is a 17 bit value). Accordingly, Hash' (V), hashes the TEP label value to a bank index. Further, Hash ( ) corresponds to a hash function (or hash table) to hash or map TEP labels (e.g., 17 bits) into a in a TEP label bank (e.g., 10 bits). Therefore, the TEP label value may be used to determine both a bank index and a TEP label bank of the bank index. S_V is a shift factor for the selected TEP label, V. Shift factor may be selected with a value from a range of 0 to 3. In the embodiments discussed in relation to the second SPI derivation formula, because the key policy is assigned to a number of TEPs that is larger than the number of TEP labels in a single TEP label bank, two hash functions are used by the second SPI derivation formula. The first hash function, Hash'( ) is for selecting the bank index of a TEP label bank that V belongs to. The second hash function, Hash ( ) is for selecting a TEP label within the TEP label bank whose bank index is selected by the first hash function, Hash'( ).

Figure 5:
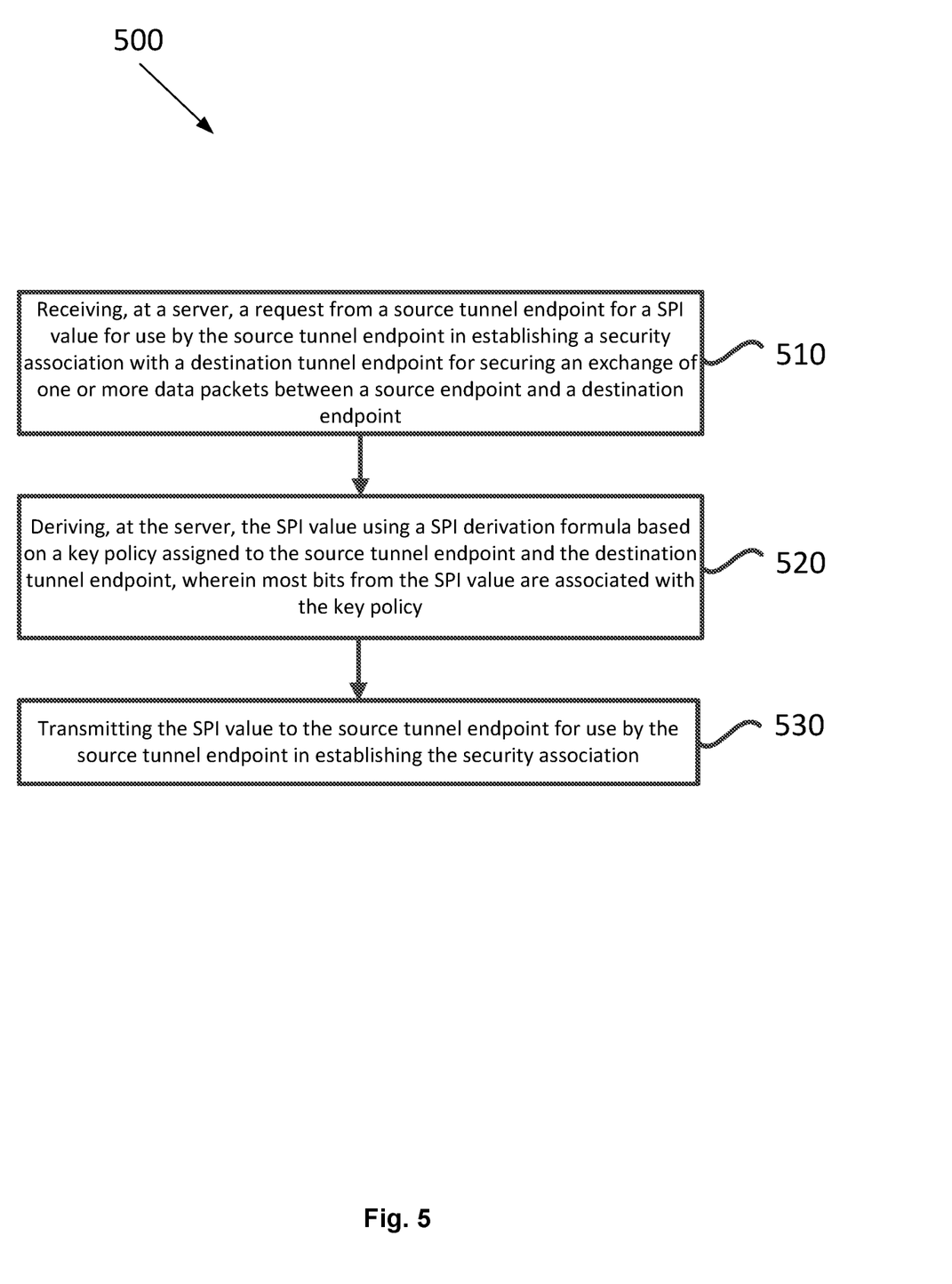
FIG. 5 illustrates an example flow diagram for deriving an SPI value for use in a security association between two tunnel endpoints, according to some embodiments.

FIG. 5 illustrates a flow diagram 500 for deriving an SPI value for use in a security association between two tunnel endpoints. Steps 510-530 of flow diagram 500 are described herein by reference to FIGS. 1-4.

At 510, a central controller (e.g., server 140) receives a request for an SPI value from a source tunnel endpoint (e.g., TEP 115) for use by the source tunnel endpoint in establishing a security association with a destination tunnel endpoint (e.g., TEP 125) for securing an exchange of one or more data packets between a first endpoint (e.g., EP 110) and a second endpoint (e.g., 120). For example, TEP 115 may receive a flow of data packets from EP 110 that are designated as packets that require encryption using the IPSec protocol. In such an example, TEP 115, which has a TEP label (e.g., of 17-bits) assigned to it, transmits a request to server 140 for an SPI value to use in a security association with TEP 125.

At 520, the central controller derives a SPI value (e.g., of 32 bits) using an SPI derivation formula based on a key policy assigned to the source tunnel endpoint and the destination tunnel endpoint, wherein most bits from the SPI value are associated with the key policy. As described above, the key policy defines properties of encryption/decryption keys used for encrypting and decrypting data packets transferred between TEP 115 and 125. As also described above, a key policy may be assigned to a certain number of TEPs, as determined by user-defined security results. In some embodiments, server 140 is able access or maintain a record of how many TEPs each key policy is assigned to. Based on such information, server 140 is able to determine how many bank indices are assigned to a certain key policy.

As an example, after receiving a request from TEP 115 for an SPI value, in some embodiments, server 140 first determines the key policy that is assigned to TEP 115. In some embodiments, server 140 makes this determination based on TEP 115's label, or EPs for which the SPI value is being derived. After identifying the key policy assigned to TEP 115, server 140 determines the number of bank indices assigned to the key policy using a mapping that maps key policies to one or more bank indices, as described above. If, based on the mapping, only a single bank index is assigned to the key policy, then server 140 may use either the first or the second SPI derivation formula described above to derive an SPI value. It's important to note that the first formula is a special and narrower version of the second formula and, therefore, in embodiments where only a single bank index is assigned to the key policy, using either one of the first or the second SPI derivation formulas leads to the same result. However, if server 140 determines that more than one bank index is assigned to the key policy, then server 140 may use the second formula described above. As described above, most bits from the derived SPI value are associated with the key policy. For example, in some embodiments, the bank index number associated with the key policy occupies more than half of all the bits (e.g., more than 16 of 32 bits) in the SPI bit space. In some embodiments, the bank index number associated with the key policy occupies more bits than either the TEP label or the shift factor.

At 530, the central controller transmits the SPI value to the source tunnel endpoint for use by the source tunnel endpoint in establishing the security association. In the example above, after receiving the SPI value, TEP 115 establishes an outbound security association with TEP 125 for encrypting all data packets arriving from EP 110 and destined for EP 120. For example, TEP 115 may receive a data packet from EP 110 that TEP 115 may encapsulate and encrypt using the outbound security association. In such an example, the encapsulated and encrypted data packet may include a first header and an encrypted payload. The first header may include the IP address of TEP 115, the destination IP address of TEP 125, and the SPI value derived in step 520. In addition, the encrypted payload may include a second header comprising the IP address of EP 110 and the IP address of EP 120. TEP 115 may then transmit the encapsulated encrypted data packet to TEP 125.

Figure 6:
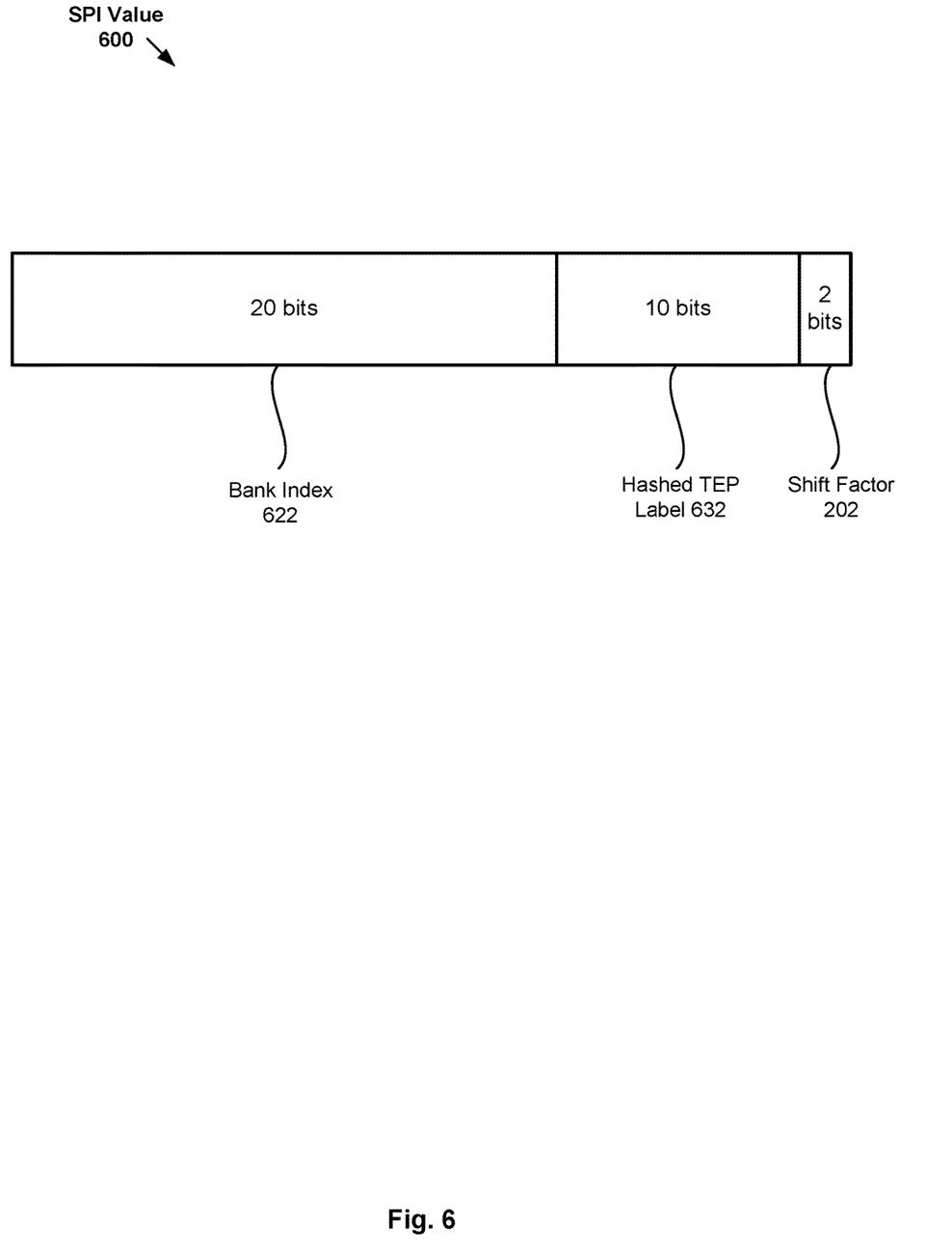
FIG. 6 illustrates a visual example of an SPI value, where most bits in the SPI value are associated with a key policy, according to some embodiments.

FIG. 6 illustrates a visual example of a 32-bit SPI value 600, where most bits in SPI value 600 are associated with a key policy. SPI value 600 includes bank index 622, TEP label 632, and shift factor 642. SPI value 600 includes bank index 622, which, as described above, may be a 20-bit binary value for identifying a bank index associated with the key policy assigned to the TEP for which the SPI value is being derived. Hashed TEP label 632 may be a 10-bit binary hash value (i.e., 10-bit TEP label) that results from hashing a 17-bit TEP label using a hash function (e.g., Hash ( )) as described above. Similar to shift factor 202 of FIG. 2, shift factor 642 occupies two bits of the 32 bits and is used for altering SPI value 600 in response to a TEP or EP restarting.

As described above, in some embodiments EPs, such as EP 110 and EP 120, as illustrated in FIG. 1, are physical computing devices (e.g., physical servers, physical hosts). However, as also described above, in some embodiments, EPs may be virtual computing instances running on a number of host machines in a network. In such embodiments, tunneling may be performed by Virtual Extensible Local Area Network (VXLAN) tunnel endpoint (VTEP) services implemented at each host or at a gateway. Other types of TEPs may be used as well that use different encapsulation protocols such as Geneve, IPsec tunneling protocol, etc.

Figure 7:
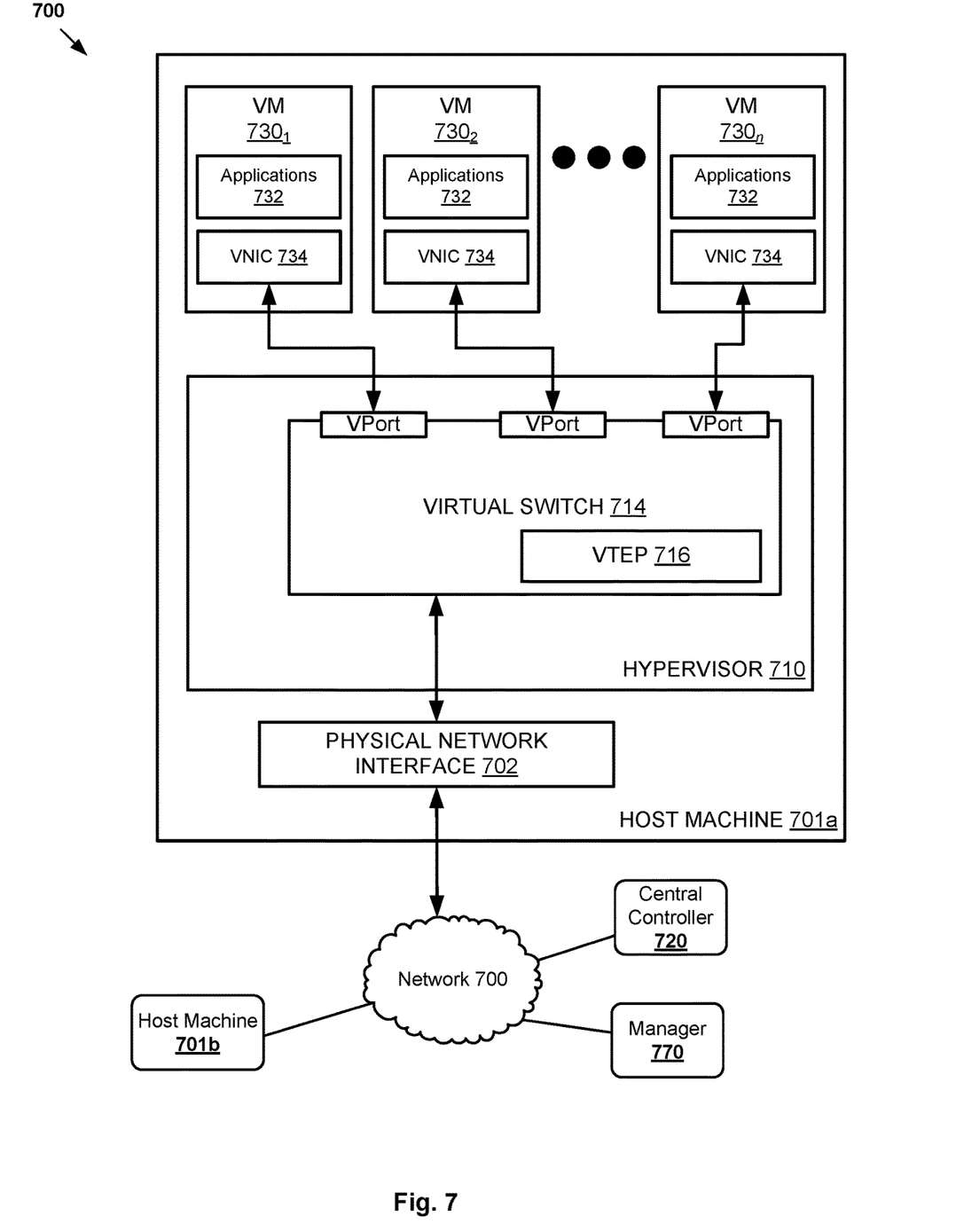
FIG. 7 is a block diagram of an example implementation of the network of FIG. 1.

FIG. 7 is a block diagram of network 700, which is an example implementation of the network of FIG. 1. Network 700 includes one or more host machines 701a-701b, a central controller 720, and a manager 770. Network 700 may be a local area network ("LAN"), a wide area network ("WAN"), or a network of networks, such as the Internet. It should be understood that network 700 may include additional and/or alternative components than that shown, depending on the desired implementation.

As illustrated, host machine 701a includes a physical network interface 702, a hypervisor 710, and a plurality of virtual machines (VMs) $730_1$-$730_n$. Host machine 701a may provide part of a computing infrastructure including multiple host machines for implementing a logical overlay network. Though not shown, host machine 701b may include similar components as host machine 701a. Though certain embodiments are described herein with respect to VMs, the same principals and techniques may also apply to other appropriate virtual computing instances (e.g., containers (e.g., Docker containers), data compute nodes, isolated user space instances, namespace containers, etc.). As shown, hypervisor 710 and the plurality of virtual machines $730_x$ reside on host machine 701a. In certain embodiments, host machine 701a is a physical general purpose computer (e.g., a server, workstation, etc.). Although not shown in FIG. 7, host machine 701a may include one or more central processing units (CPUs), system memory, and non-volatile data storage, in addition to one or more network interfaces, such as physical network interface (PNIC) 702, for communicating with other hardware computing platforms, entities, or host machines on a physical network accessible through physical network interface 702.

Hypervisor 710 includes a virtual switch 714, which is like a physical network switch implemented in software. It serves as an interface between the hosted virtual machines 730, physical network interface 702, as well as other physical resources available on host machine 701a. Hypervisor 710 further includes a hypervisor-based VTEP 716 coupled to or part of the virtual switch 714. Accordingly, VTEP 716 may be responsible for providing VTEP services for a plurality of the VMs 730 on the same host machine 701a as VTEP 716. In alternate embodiments, virtual switch 714, VTEP 716, and/or physical device drivers may execute in a privileged virtual machine often referred to as a "Domain zero", "root-", or "parent-partition." Each virtual machine 730 includes a virtual network interface card (VNIC) 734, which is responsible for exchanging packets between the virtual machine 730 and hypervisor 710. VNICs 734 may be, in some cases, a software abstraction of a physical network interface card. Each virtual machine 730 is connected to a virtual port (vport) provided by virtual switch 714, and virtual switch 714 is connected to physical network interface 702 to allow network traffic to be exchanged between virtual machines 730 executing on host machine 101a and external network destinations. Virtual switch 714 may serve as a physical network switch, i.e., serve as an edge device on the physical network, but implemented in software.

In addition to host machines 701a and 701b, network 700 also includes central controller 720 and manager 730. In a Software-defined Networking ("SDN") environment, manager 770 may be responsible for centralizing network management and receiving user input (e.g., through an application programming interface), in certain embodiments. Users (e.g., network administrators) may input data such as network configuration data, security rules, and key policies through, for example, a command-line interface, a graphical user interface, etc. Based on the user input, manager 770 then builds logical objects descriptive of the desired state of the SDN environment that is communicated to central controller 720.

Central controller 720, in some embodiments, performs the functions of the server (e.g., server 140) described in relation to FIGS. 1-6. In an SDN environment, central controller 720 may be in charge of managing the various components within network 700 and maintaining information about VMs, hosts, etc. In some embodiments, central controller 720 manages these components using different sets of APIs. In such embodiments, for example, central controller 720 communicates with manager 770 through a northbound API while using a southbound API to communicate with the various host machines (e.g., host machine 701a and 701b). For instance, in some embodiments, central controller 720 may receive user input or updates from manager 770, determine the virtual machines that need to be updated, and then distribute the updates to the host machines supporting those VMs via local controllers residing on the host machines. In some embodiments, each of host machines 701a-701b also includes a local controller, running in the host machine's hypervisor, for managing interactions between the host machine and central controller 720. In some embodiments, central controller 720 may store security rules and key policies in memory allocated to central controller 720.

Though shown as single entities, it should be understood that both central controller 720 and manager 770 may be implemented as a distributed or clustered system(s). That is, manager 770 may include multiple computing devices or virtual machines that implement management plane functions. In addition, central controller 720 may be a network controller cluster including multiple network controller nodes (e.g. central controller computers or virtual machines or containers or other logical compute instances that implement central control plane functions. In some embodiments, each centralized controller may include both management plane and central control plane functions (e.g., as separate applications or functions).

As described above, in some embodiments, host machine 701b includes similar components as host machine 701a. In some embodiments, VTEP 716 and a VTEP provided by the virtual switch of host machine 701a connect one or more VMs 130 on host machine 701a together with one or more VMs on host machine 701b in a logical overlay network. For example, VM 730$_1$ may be a source EP, such as EP 110 as described above, and a virtual machine running on host machine 701b may be a destination EP, such as EP 120. In addition, in such an example, VTEP 716 may perform the functions of source TEP 115 and a VTEP provided by a hypervisor residing on host machine 701b may perform the functions of TEP 125.

For example, VM 730$_1$ may send data packets to virtual switch 714 for transmission to a VM running on host machine 701b in an IPSec secured fashion. In such an example, virtual switch 714 utilizes VTEP 716 for providing IPSec tunneling services for the transmission of packets. Similar to operations 500 described above, VTEP 716 may then send a request to central controller 720 for an SPI value for use in establishing an outbound security association with the VTEP running on a hypervisor residing on host machine 701b. As described above, central controller 720 receives information relating to security rules and key policies from manager 770, which receives such information as input from users (e.g., network administrators). As such, central controller 720 is able to determine the key policy that is assigned to VTEP 716 based on a corresponding security policy. In addition, central controller 720 is able to determine a VTEP label assigned to VTEP 716 or the underlying hypervisor 710. Based on the key policy and the one or more bank indices assigned to it as well the VTEP label, central controller 720 then continues the operations described in steps 520 and 530 of operation 500 to derive an SPI value, using an SPI derivation formula, and transmit the calculated SPI value to host machine 701a for use by VTEP 716 in establishing a security association with a VTEP of a virtual switch residing on the hypervisor hosted by host machine 701b.

In host machine 701a, processing unit(s) may retrieve instructions to execute and data to process in order to execute the processes discussed herein. The processing unit(s) may be a single processor or a multi-core processor in different embodiments.

Certain embodiments as described above involve a hardware abstraction layer on top of a host computer. The hardware abstraction layer allows multiple contexts or virtual computing instances to share the hardware resource. In some embodiments, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs.

It should be noted that these embodiments may also apply to other examples of virtual computing instances, such as containers not including a guest operating system, referred to herein as "OS-less containers." OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for providing a security parameter index (SPI) value for use in establishing a security association between a source tunnel endpoint and a destination tunnel endpoint, comprising:

receiving, at a server, a request from the source tunnel endpoint for a SPI value for use by the source tunnel endpoint in establishing the security association with the destination tunnel endpoint for securing an exchange of one or more data packets between a source endpoint and a destination endpoint;

deriving, at the server, the SPI value using a SPI derivation formula based on a key policy assigned to the source tunnel endpoint and the destination tunnel endpoint, wherein most bits from the SPI value are associated with the key policy; and transmitting, at the server, the SPI value to the source tunnel endpoint for use by the source tunnel endpoint in establishing the security association, wherein the established security association is used by the source tunnel endpoint to encapsulate and encrypt at least a data packet from the one or more data packets received from the source endpoint and destined for the destination endpoint, the encapsulated encrypted data packet comprising a first header and an encrypted payload, the first header comprising a source IP address of the source tunnel endpoint, a destination IP address of the destination tunnel endpoint, and the SPI value, the encrypted payload comprising a second header comprising a source IP address of the source endpoint and a destination IP address of the destination endpoint, and wherein the encapsulated encrypted data packet is transmitted by the source tunnel endpoint to the destination tunnel endpoint, wherein the key policy defines one or more properties of an encryption key of the established security association, and wherein the encryption key is used for encrypting the data packet.

2. The method of claim 1, wherein the SPI value comprises a bank index value corresponding to a bank index associated with the key policy, a hash of a tunnel endpoint value of the source tunnel endpoint, and a shift factor, wherein the hash of the tunnel endpoint value comprises fewer bits than the tunnel endpoint value.

3. The method of claim 2, wherein deriving the SPI value comprises deriving the bank index value based on a second hash of the tunnel endpoint value of the source tunnel endpoint value.

4. The method of claim 3, wherein deriving the SPI value further comprises utilizing the second hash to select the bank index value from a set of bank index values associated with the key policy.

5. The method of claim 1, wherein the SPI derivation formula comprises:

$$SPI(K, V, S\_V) = (K * V\_Bank + Hash(V)) << 2 + S\_V \& 0x03;$$
and wherein SPI represents a binary value corresponding to the SPI value, KP corresponds to the key policy, V corresponds to a tunnel endpoint value of the source tunnel endpoint, S_V corresponds to a shift factor, K corresponds to a bank index value corresponding to a bank index associated with the key policy, V_Bank corresponds to a size of a bank of tunnel endpoint values, and HO corresponds to a hash function for hashing the tunnel endpoint value of the source tunnel endpoint to generate a hash of the tunnel endpoint value.

6. The method of claim 1, wherein the SPI derivation formula comprises:

$$SPI(KP,V,S\_V)=(K\_Set[Hash'(V) \% Card(K\text{-}Set)] *V\_Bank+Hash(V))<<2+S\_V \& 0x03$$

wherein SPI represents a binary value corresponding to the SPI value, KP corresponds to the key policy, V corresponds to a tunnel endpoint value of the source tunnel endpoint, S_V corresponds to a shift factor, K_Set corresponds to a set of bank indices allocated to the key policy, Hash'( ) corresponds to a hash function configured to identify a bank index of a certain tunnel endpoint value from among the set of bank indices, Card (K-Set) corresponds to a cardinality of K_Set, V_Bank corresponds to a size of a bank of tunnel endpoint values, and HO corresponds to a hash function for hashing the tunnel endpoint value of the source tunnel endpoint to generate a hash of the tunnel endpoint value.

7. The method of claim 1, wherein the deriving the SPI value further comprises hashing a tunnel endpoint value of the source tunnel endpoint to a hash of the tunnel endpoint value using a hash function configured to resolve hash collisions.

8. The method of claim 1, further comprising:
selecting the SPI derivation formula based on a number of tunnel endpoints the key policy is assigned to prior to the deriving.

9. A non-transitory computer readable medium comprising instructions to be executed in a computer system, wherein the instructions when executed in the computer system perform a method for providing a security parameter index (SPI) value for use in establishing a security association between a source tunnel endpoint and a destination tunnel endpoint, the method comprising:
deriving the SPI value using a SPI derivation formula based on a key policy assigned to the source tunnel endpoint and the destination tunnel endpoint, wherein most bits from the SPI value are associated with the key policy; and
transmitting the SPI value to the source tunnel endpoint for use by the source tunnel endpoint in establishing the security association, wherein the established security association is used by the source tunnel endpoint to encapsulate and encrypt at least a data packet from the one or more data packets received from the source endpoint and destined for the destination endpoint, the encapsulated encrypted data packet comprising a first header and an encrypted payload, the first header comprising a source IP address of the source tunnel endpoint, a destination IP address of the destination tunnel endpoint, and the SPI value, the encrypted payload comprising a second header comprising a source IP address of the source endpoint and a destination IP address of the destination endpoint, and wherein the encapsulated encrypted data packet is transmitted by the source tunnel endpoint to the destination tunnel endpoint, wherein the key policy defines one or more properties of an encryption key of the established security association, and wherein the encryption key is used for encrypting the data packet.

10. The non-transitory computer readable medium of claim 9, wherein the SPI value comprises a bank index value corresponding to a bank index associated with the key policy, a hash of a tunnel endpoint value of the source tunnel endpoint, and a shift factor, wherein the hash of the tunnel endpoint value comprises fewer bits than the tunnel endpoint value.

11. The non-transitory computer readable medium of claim 10, wherein deriving the SPI value comprises deriving the bank index value based on a second hash of the tunnel endpoint value of the source tunnel endpoint value.

12. The non-transitory computer readable medium of claim 11, wherein deriving the SPI value further comprises utilizing the second hash to select the bank index value from a set of bank index values associated with the key policy.

13. The non-transitory computer readable medium of claim 9, wherein the SPI derivation formula comprises:

$$SPI(K,V,S\_V)=(K*V\_Bank+Hash(V))<<2+S\_V \& 0x03;$$
and wherein SPI represents a binary value corresponding to the SPI value, KP corresponds to the key policy, V corresponds to a tunnel endpoint value of the source tunnel endpoint, S_V corresponds to a shift factor, K corresponds to a bank index value corresponding to a bank index associated with the key policy, V_Bank corresponds to a size of a bank of tunnel endpoint values, and HO corresponds to a hash function for hashing the tunnel endpoint value of the source tunnel endpoint to generate a hash of the tunnel endpoint value.

14. The non-transitory computer readable medium of claim 9, wherein the SPI derivation formula comprises:

$$SPI(KP,V,S\_V)=(K\_Set[Hash'(V) \% Card(K\text{-}Set)] *V\_Bank+Hash(V))<<2+S\_V \& 0x03;$$ and wherein SPI represents a binary value corresponding to the SPI value, KP corresponds to the key policy, V corresponds to a tunnel endpoint value of the source tunnel endpoint, S_V corresponds to a shift factor, K_Set corresponds to a set of bank indices allocated to the key policy, Hash'( ) corresponds to a hash function configured to identify a bank index of a certain tunnel endpoint value from among the set of bank indices, Card (K-Set) corresponds to a cardinality of K_Set, V_Bank corresponds to a size of a bank of tunnel endpoint values, and HO corresponds to a hash function for hashing the tunnel endpoint value of the source tunnel endpoint to generate a hash of the tunnel endpoint value.

15. The non-transitory computer readable medium of claim 9, wherein the deriving the SPI value further comprises hashing a tunnel endpoint value of the source tunnel endpoint to a hash of the tunnel endpoint value using a hash function configured to resolve hash collisions.

16. The non-transitory computer readable medium of claim 9, further comprising:
selecting the SPI derivation formula based on a number of tunnel endpoints the key policy is assigned to prior to the deriving.

17. A computer system, comprising:
a memory comprising executable instructions; and
a processor in data communication with the memory and configured to execute the instructions to cause the computer system to perform a method for providing a security parameter index (SPI) value for use in establishing a security association between a source tunnel endpoint and a destination tunnel endpoint, the method comprising:

receiving a request from the source tunnel endpoint for a SPI value for use by the source tunnel endpoint in establishing the security association with the destination tunnel endpoint for securing an exchange of one or more data packets between a source endpoint and a destination endpoint;

deriving the SPI value using a SPI derivation formula based on a key policy assigned to the source tunnel endpoint and the destination tunnel endpoint, wherein most bits from the SPI value are associated with the key policy; and transmitting the SPI value to the source tunnel endpoint for use by the source tunnel endpoint in establishing the security association, wherein the established security association is used by the source tunnel endpoint to encapsulate and encrypt at least a data packet from the one or more data packets received from the source endpoint and destined for the destination endpoint, the encapsulated encrypted data packet comprising a first header and an encrypted payload, the first header comprising a source IP address of the source tunnel endpoint, a destination IP address of the destination tunnel endpoint, and the SPI value, the encrypted payload comprising a second header comprising a source IP address of the source endpoint and a destination IP address of the destination endpoint, and wherein the encapsulated encrypted data packet is transmitted by the source tunnel endpoint to the destination tunnel endpoint, wherein the key policy defines one or more properties of an encryption key of the established security association, and wherein the encryption key is used for encrypting the data packet.

18. The computer system of claim 17, wherein the SPI value comprises a bank index value corresponding to a bank index associated with the key policy, a hash of a tunnel endpoint value of the source tunnel endpoint, and a shift factor, wherein the hash of the tunnel endpoint value comprises fewer bits than the tunnel endpoint value.

19. The computer system of claim 18, wherein deriving the SPI value comprises deriving the bank index value based on a second hash of the tunnel endpoint value of the source tunnel endpoint value.

20. The computer system of claim 19, wherein deriving the SPI value further comprises utilizing the second hash to select the bank index value from a set of bank index values associated with the key policy.

21. The computer system of claim 17, wherein the SPI derivation formula comprises:

$$SPI(K, V, S\_V) = (K * V\_Bank + Hash(V)) << 2 + S\_V \& 0x03;$$
and wherein SPI represents a binary value corresponding to the SPI value, KP corresponds to the key policy, V corresponds to a tunnel endpoint value of the source tunnel endpoint, S_V corresponds to a shift factor, K corresponds to a bank index value corresponding to a bank index associated with the key policy, V_Bank corresponds to a size of a bank of tunnel endpoint values, and HO corresponds to a hash function for hashing the tunnel endpoint value of the source tunnel endpoint to generate a hash of the tunnel endpoint value.

22. The computer system of claim 17, wherein the SPI derivation formula comprises:

$$SPI(KP, V, S\_V) = (K\_Set[Hash'(V) \% Card(K\text{-}Set)] * V\_Bank + Hash(V)) << 2 + S\_V \& 0x03;$$
and wherein SPI represents a binary value corresponding to the SPI value, KP corresponds to the key policy, V corresponds to a tunnel endpoint value of the source tunnel endpoint, S_V corresponds to a shift factor, K_Set corresponds to a set of bank indices allocated to the key policy, Hash'( ) corresponds to a hash function configured to identify a bank index of a certain tunnel endpoint value from among the set of bank indices, Card (K-Set) corresponds to a cardinality of K_Set, V_Bank corresponds to a size of a bank of tunnel endpoint values, and HO corresponds to a hash function for hashing the tunnel endpoint value of the source tunnel endpoint to generate a hash of the tunnel endpoint value.

23. The computer system of claim 17, wherein the deriving the SPI value further comprises hashing a tunnel endpoint value of the source tunnel endpoint to a hash of the tunnel endpoint value using a hash function configured to resolve hash collisions.

24. The computer system of claim 17, further comprising:
selecting the SPI derivation formula based on a number of tunnel endpoints the key policy is assigned to prior to the deriving.

* * * * *

UNITED STATES PATENT AND TRADEMARK OFFICE
CERTIFICATE OF CORRECTION

PATENT NO. : 10,659,440 B2  
APPLICATION NO. : 15/827368  
DATED : May 19, 2020  
INVENTOR(S) : Dexiang Wang et al.

Page 1 of 1

It is certified that error appears in the above-identified patent and that said Letters Patent is hereby corrected as shown below:

In the Claims

Column 14, Line 62: from "SPI(K, V,S_V) (K*V_Bank+Hash(V))«2+S_V&Ox03;" to "SPI(KP, V,S_V) (K*V_Bank+Hash(V))«2+S_V&Ox03;";

Column 15, Line 4: from "HO" to "H()";

Column 15, Line 24: from "HO" to "H()";

Column 16, Line 21: from "SPI(K, V,S_V) (K*V_Bank+Hash(V))«2+S_V&Ox03;" to "SPI(KP, V,S_V) (K*V_Bank+Hash(V))«2+S_V&Ox03;";

Column 16, Line 30: from "HO" to "H()";

Column 16, Line 49: from "HO" to "H()";

Column 18, Line 6: from "SPI(K, V,S_V) (K*V_Bank+Hash(V))«2+S_V&Ox03;" to "SPI(KP, V,S_V) (K*V_Bank +Hash(V))«2+S_V&Ox03;";

Column 18, Line 15: from "HO" to "H()";

Column 18, Line 35: from "HO" to "H()".

Signed and Sealed this  
First Day of September, 2020

Andrei Iancu  
*Director of the United States Patent and Trademark Office*